United States Patent [19]

Kawakami et al.

[11] Patent Number: 4,495,345
[45] Date of Patent: Jan. 22, 1985

[54] OPTICAL ELEMENT AND OPTICAL POLYCARBONATE RESIN COMPOSITION FOR THE PREPARATION THEREOF

[75] Inventors: Sota Kawakami, Hachioji; Hideki Murata, Akishima; Satoshi Matsunaga, Hino; Toshihiko Kiriki, Hachioji, all of Japan

[73] Assignee: Konishiroku Photo Industry Co., Ltd., Tokyo, Japan

[21] Appl. No.: 474,464

[22] Filed: Mar. 11, 1983

[30] Foreign Application Priority Data

Mar. 18, 1982 [JP] Japan .................................. 57-43841

[51] Int. Cl.³ ............................................. C08G 63/62
[52] U.S. Cl. ....................................... 528/372; 528/25; 528/43; 528/174; 528/196; 528/201; 528/208; 528/370
[58] Field of Search ...................... 528/372, 370, 196

[56] References Cited

U.S. PATENT DOCUMENTS 3,554,742 1/1971 Gramza et al. .......................... 528/372

Primary Examiner—Harold D. Anderson
Attorney, Agent, or Firm—Jordan B. Bierman

[57] ABSTRACT

An optical element including an optical resin composition consisting essentially of a polycarbonate is disclosed. Said optical resin composition have a melt flow rate of more than or equal to 5.0 g/10 min. as measured based on ISO R-1133 Standard under the condition of 230° C. and 5 kgf. and have a glass transition point of more than or equal to 100° C. Said polycarbonate include a major repeating unit represented by the formula (I) or (II).

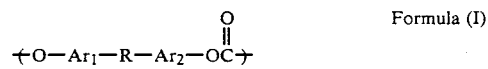

Formula (I)

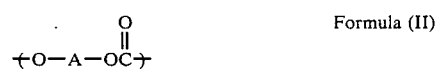

Formula (II)

wherein $Ar_1$ and $Ar_2$ each represent an arylene group or a cycloalkylene group; R represents an alkylene group, a cycloalkylene group, —O—, —O—$Ar_3$—O—, —S—, —SO—, —SO$_2$—, —SO$_2$—$Ar_3$—SO$_2$—, —$R_1$—$Ar_4$—$R_1$—, —O—$R_1$—O—,

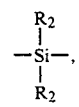

—CONH—$R_1$—NHCO—, or —$Ar_5$—$R_1$—; $Ar_3$ and $Ar_4$ each represent a phenylene group or a bisphenylene group; $R_1$ represents an alkylene group; $R_2$ represents an alkyl group; $Ar_5$ represents a cycloalkylene group, —$R_1$—$Ar_4$—$R_1$—, —$R_1$—$Ar_5$—$R_1$—, —$R_1$—O—$Ar_4$—O—$R_1$—, or —$R_1$—O—$Ar_4$—X—$Ar_4$—O—$R_1$; and X represents —SO$_2$—, —CO—, an alkylene group, or —$R_1$—$Ar_4$—$R_1$—.

6 Claims, 2 Drawing Figures

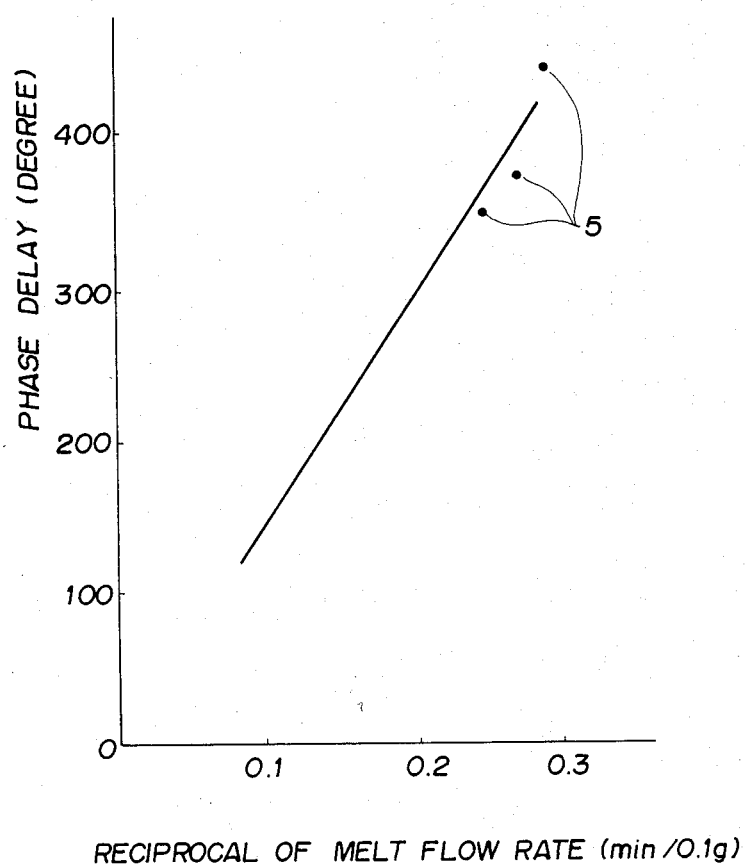

OPTICAL ELEMENT AND OPTICAL POLYCARBONATE RESIN COMPOSITION FOR THE PREPARATION THEREOF

FIELD OF THE INVENTION

The present invention relates to an optical plastic element which is prepared by way of an injection molding, a compression molding or the like. The present invention also relates to an optical resin composition to be used for the preparation of said optical element. The optical resin composition includes a main monomer component comprising bis(4-hydroxyphenyl)alkylene or the derivative thereof.

BACKGROUND OF THE INVENTION

Optical plastic elements are of late years in great demand on the ground of their good natures that they are lighter in weight than the glass elements, highly resistible to impact, they do not require surface glinding, are easily mass-produced, and able to give lenses which have non-spherical surface or surfaces. The optical plastic elements, however, have several disadvantages that they have low evenness in their surfaces, narrow selectivity in making refractive indices and high birefringence, which are derived from their manufacturing conditions and their inherent characteristics, so that they, in fact, have many limitations in their practical uses.

Particularly, in the field of fine optics where the optical elements are used for reading and writing of information by means of laser or the like, there is much necessity to improve the birefringence of the optical plastic elements.

As is well known to the art, the birefringence of the optical plastic element varies, in many cases, in accordance with their molding conditions as well as their inherent characteristics. To this point of view, the double refraction of the optical plastic element has been tried to be reduced by way of improving the molding conditions of the elements. However, those trials are less fruitful under the existing circumstances in that the fine optical elements are gradually coming into higher requirement and in that more strict reduction of the birefringence, which can not be fully met by any improvement of the molding conditions, must be accomplished. Therefore, the birefringence of the optical plastic element is now intended to be reduced by changing the plastic material to be used for the preparation of the optical plastic element.

SUMMARY OF THE INVENTION

An object of the present invention, therefore, is to provide an optical plastic material to be subjected to an injection molding, a compression molding or the like, which, after molded, can show an improved birefringence.

Another object of the present invention is to provide an optical plastic element prepared as a molding product, which shows an improved birefringence.

These objects, mentioned above, of the present invention are accomplished by an optical resin composition which includes a main component being a polycarbonate, which has a melt flow rate of more than or equal to 5.0 g/10 min. as measured based on ISO R-1133 Standard under the conditions of 230° C. and 5 kgf., and which has a glass transition point of more than or equal to 100° C.

BRIEF EXPLANATION OF THE DRAWINGS

FIG. 2 of the drawings shows relationships between the melt flow rate and the birefringence of the molding products molded at the temperature of 270° C., in which designated by 5 are dots representing said relationships concerning known polycarbonate resins having the melt flow rates of less than 5 g/10 min. as measured based on ISO R-1133 Standard under the conditions of 230° C. and 5 kgf.

DETAILED DESCRIPTION OF THE INVENTION

Figure 1:
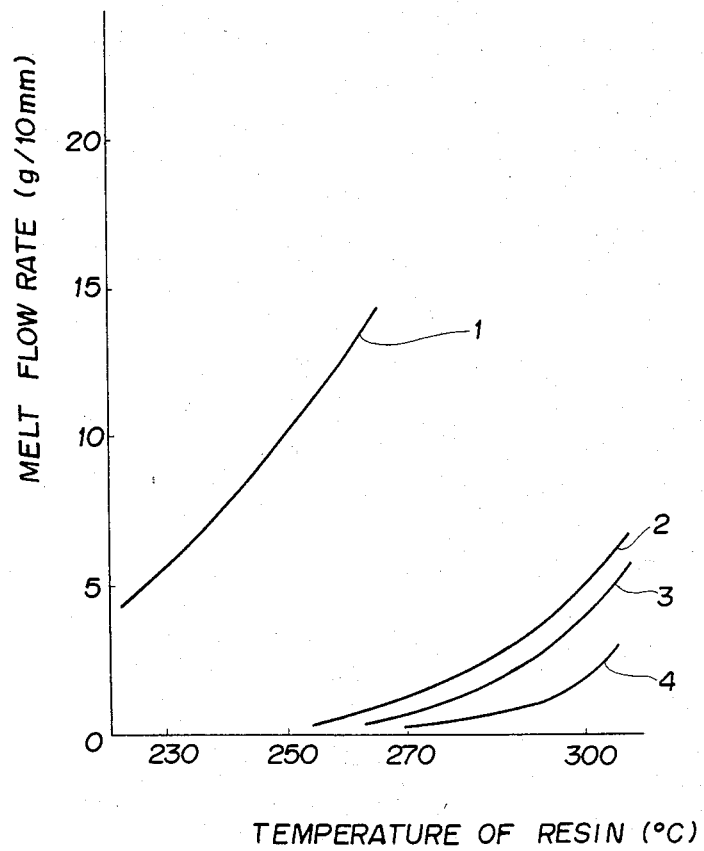
FIG. 1 of the drawings shows relationships between the temperature and the melt flow rate of the resins in which designated by 1 is a curve representing said relationship concerning one example of the optical resin composition according to the present invention, and designated by 2, 3 and 4 are curves representing said relationships concerning polycarbonate resins which have melt flow rates of less than 5 g/10 min. as measured based on ISO R-1133 Standard under the conditions of 230° C. and 5 kgf.

In accordance with the present invention, the above-mentioned polycarbonate according to the present invention may be any polycarbonate which has the above defined melt flow rate and glass transition point. Among such polycarbonates, the polycarbonate according to the present invention preferably is a polymer including a major repeating unit represented by the following formula (I) or (II), more preferably is a polymer including a major repeating unit represented by the following formula (III).

Formula (I)

wherein $Ar_1$ and $Ar_2$ each represents an arylene group or a cycloalkylene group; R represents an alkylene group, a cycloalkylene group, $-O-$, $-O-Ar_3-O-$, $-S-$, $-SO-$, $-SO_2-$, $-SO_2-Ar_3-SO_2-$, $-R_1-Ar_4-R_1$, $-O-R_1-O-$,

$-CONH-R_1-NHCO-$ or $-Ar_5-R_1-$; $Ar_3$ and $Ar_4$ each represents a phenylene group or a bisphenylene group; $R_1$ represents an alkylene group; $R_2$ represents a cycloalkylene group; and $Ar_5$ represents a cycloalkylene group.

Formula (II)

wherein A represents an alkylene group, a cycloalkylene group, $-R_1-Ar_4-R_1-$, $-R_1-Ar_5-R_1-$, $-R_1-O-Ar_4-O-R_1-$, or $-R_1-O-Ar_4-X-Ar_4-O-R_1$; X represents $-SO_2-$, $-CO-$, an alkylene group or $-R_1-Ar_4-R_1-$; $R_1$, $Ar_4$ and $Ar_5$ each has the same meaning as mentioned above.

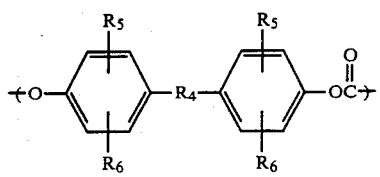

Formula (III)

wherein R₄ represents

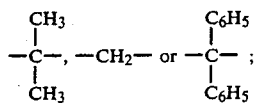

and $R_5$ and $R_6$ each represents a hydrogen, a halogen, an alkyl group or an aryl group.

In connection with the above formulae (I), (II) and (III), an arylene group preferably is a phenylene group or a naphtylene group; a cycloalkylene group preferably is a cycloalkylene group having from 4 to 7 ring members such as, for example, a cyclohexylene group, a cyclobutylene group; an alkylene group preferably is a straight or branched alkylene group having from 1 to 18 carbon atoms; an alkyl group preferably is an alkylene group having from 1 to 6 carbon atoms, such as, for example, a methyl group, a iso-propyl group and a tert-butyl group; and a halogen preferably is a fluorine, a chlorine or a bromine atom.

Moreover, each group mentioned in connection with the above formulae (I), (II) and (III), may be either a group which has not a substituent group (or a substituent atom) or a group which has a substituent group or groups (or a substituent atom or atoms). Illustrative examples of such substituent groups (or substituent atoms) include any substituents which may be introduced into said group, and include as preferable examples a halogen such as a fluorine, a chroline and a bromine, an alkyl group such as alkyl groups having from 1 to 4 carbon atoms, an aryl group such as a phenyl group and a naphtyl group, a cycloalkyl group such as a cyclohexyl group and a norbonyl group, and a alkoxy group such as a methoxy group.

In accordance with the present invention, the polymer mentioned above as structurally including the major recurring unit represented by the formulae (I), (II) and (III) is defined as the polymer which includes 50% by weight or more of the recurring unit represented by the formula. In the same manner, the optical resin composition mentioned above as including the main component being said polymer is defined as the optical resin composition which includes 95–100% by weight of said polymer.

The optical resin composition according to the present invention is characterized, on the one hand, in that said composition includes the polymer made up mainly of the major monomer component consisted of at least one of bis(4-hydroxyphenyl)alkylene and the derivatives thereof which have sufficiently high values of the melt flow rate in themselves.

As is well known to the art, the optical plastic element is usually a molding product prepared by the steps comprising melting a resin and cooling the thus melted resin in the mold. In case the resin composition has high value of viscosity when melted, the molten resin composition is liable to be unevenly cooled, so that the molding product remains to have optical strain which results in some degree of the double refraction. Particularly, in the case of using the injection molding in which the molten resin is injected into the mold, the highly viscous molten resin is cooled while remaining orientation of the resin in the direction it flows, thus the molding product is liable to have double refraction.

Since the viscosity of the molten resin varies in conjunction with the temperature of the resin as shown in FIG. 1 of the drawings, the resin may possibly be given low viscosity when melted at high temperature. The high temperature, however, can not be given for fear of the decomposition of the resin.

The present inventors have found that the double refraction of the resin molding product correlates quantitatively to the melt flow rate of the resin as illustrated in FIG. 2 of the drawings. As a result of earnest studies, the present inventors have also found that the optical resin composition, which includes a main component being a polymer prepared from a monomer composition containing 50% by weight or more of at least one of bis(4-hydroxy-phenyl)alkylene or the derivative thereof, can be given much reduced double refraction as compared with the known polycarbonate type resin or resin composition which is used for the preparation of the optical elements, provided that said optical resin composition has a melt flow rate of more than or equal to 5.0 g/10 min. as measured based on ISO R-1133 Standard under the conditions of 230° C. and 5 kgf.

The melt flow rate of the polymer according to the present invention, which is prepared from the monomer composition containing 50% by weight or more of at least one of bis(4-hydroxyphenyl)alkylene and the derivatives thereof, can be reduced by making the molecular weight of the polymer smaller than the widely usable resin used in the molding of the optical elements. In this case, the glass transition point (Tg) of the optical resin composition must be kept more than or equal to 100° C., because an overly reduced molecular weight of the polymer gives the molding product a worse heat resistivity.

The polymer according to the present invention may contain relatively large amount of monomer components that should not harm the molding conditions and product, and that may be given by controlling residual monomers in the polymerization reaction of the optical resin composition, in order to increase the melt flow rate of the optical resin composition. The amount of the residual monomer components is preferably less than or equal to 2% by weight, more preferably less than or equal to 0.5% by weight of the optical resin composition according to the present invention.

In order to increase the melt flow rate, the optical resin composition according to the present invention may contain one or more plasticizers which can work as normally efficacious plasticizer. Usable plasticizers include, for example, alkyl phthalates such as 2-ethylhexyl phthalate, n-butyl phthalate, i-decanyl phthalate, tridecanyl phtahlate, heptyl phthalate and nonyl phthalate, alkyl esters of dibasic acids such as 2-ethylhexyl adipate and 2-ethylhexyl sebacate, alkyl esters of phosphoric acid such as tributyl phosphate, trioctyl phosphate, tricresyl phosphate and triphenyl phosphate, epoxidized esters of aliphatic acids such as epoxidized octyl oleate and epoxidized butyl oleate, polyester type plasticizers and chlorinated esters of aliphatic acids.

The polymer according to the present invention is a condensation product prepared by way of a condensation reaction of a diol component and a phosgene carrier such as, for example, phosgene, diphenylcarbonate and diimidazolyl ketone. The polymer may include one diol component, or two or more diol components and may include one phosgene carrier, or two or more phosgene carriers.

The optical resin composition according to the present invention may include one or more known polycarbonates other than the polymer according to the present invention.

The polymer according to the present invention may be exemplified by the following structural formulae.

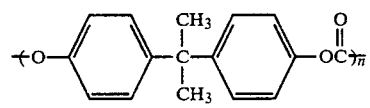
1.

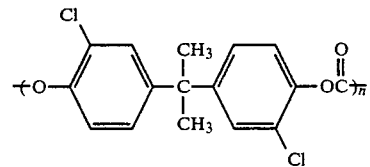
2.

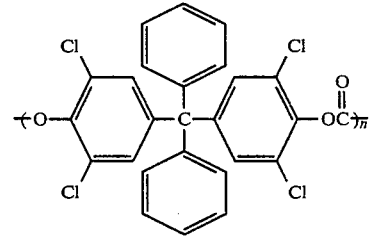
3.

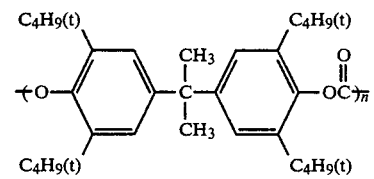
4.

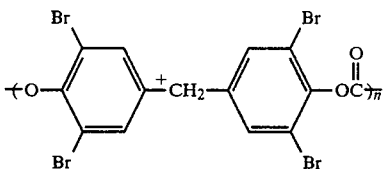
5.

In addition, illustrative examples of the polymers consisting merely diol components according to the present invention include the following compounds.

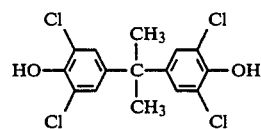

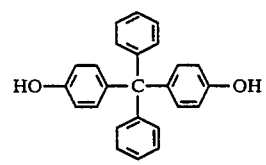

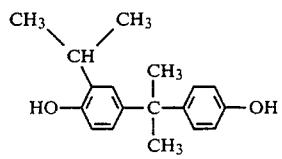

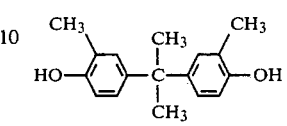

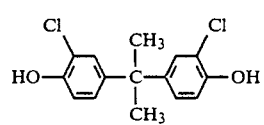

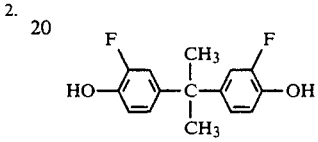

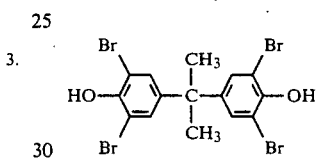

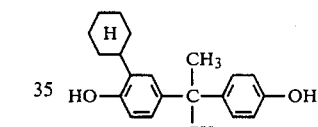

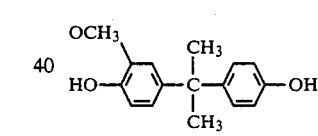

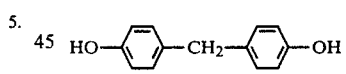

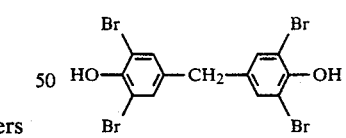

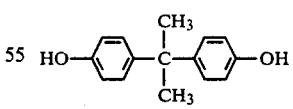

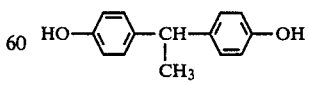

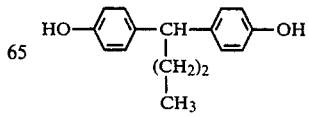

-continued
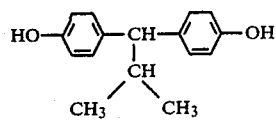
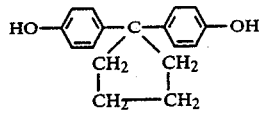
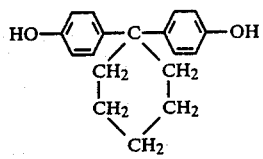
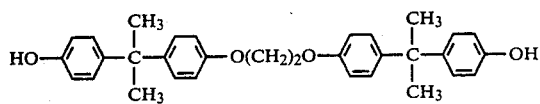
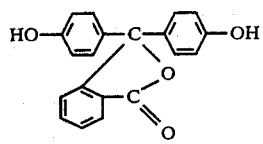
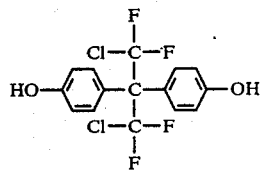
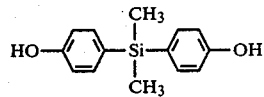
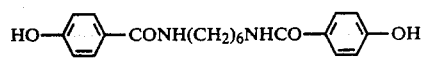
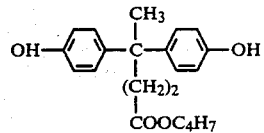
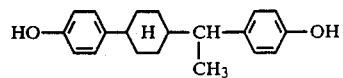
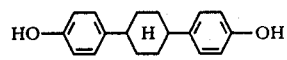
-continued
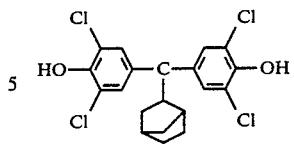
HO(CH$_2$)$_3$OH
HO(CH$_2$)$_4$OH
HO(CH$_2$)$_5$OH
HO(CH$_2$)$_6$OH
HO(CH$_2$)$_{10}$OH
HO(CH$_2$)$_2$O(CH$_2$)$_2$OH
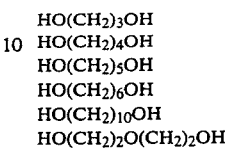
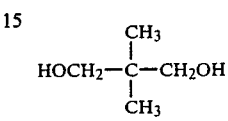
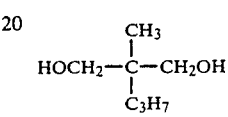
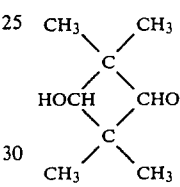
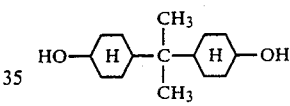
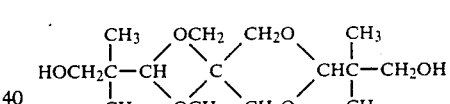
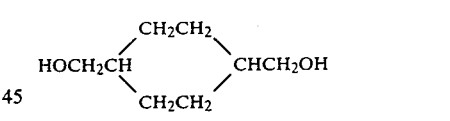
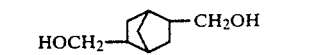
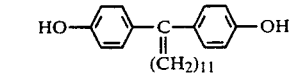
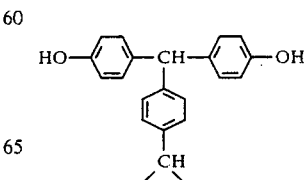
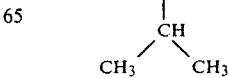

-continued
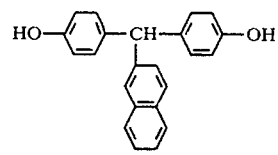
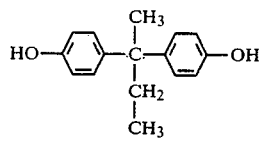
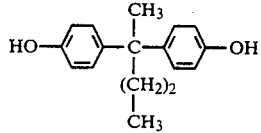
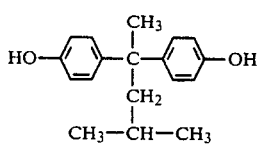
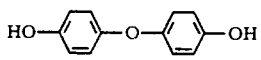
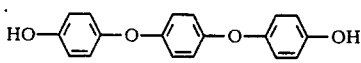
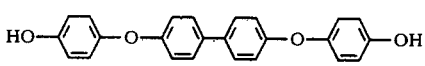
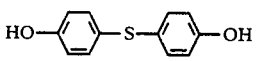
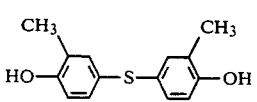
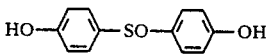
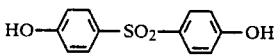
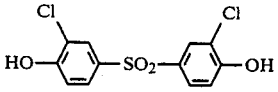
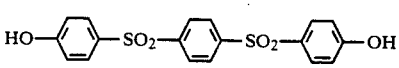
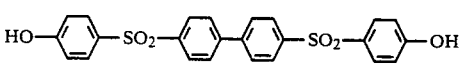
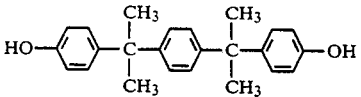
-continued
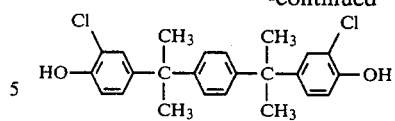
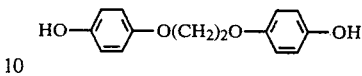
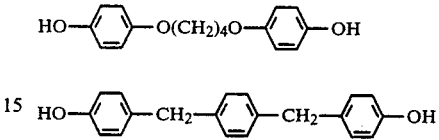
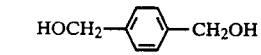
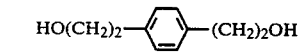
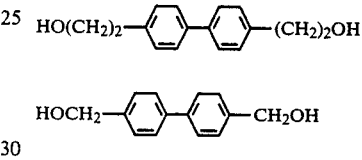
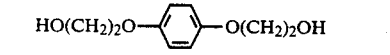
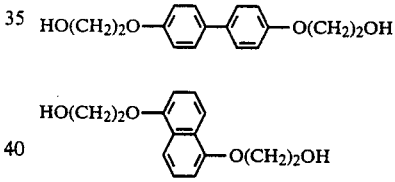
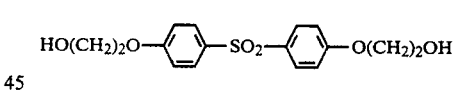
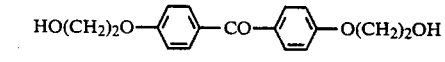
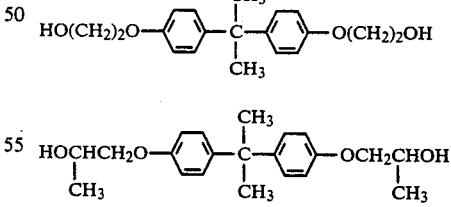
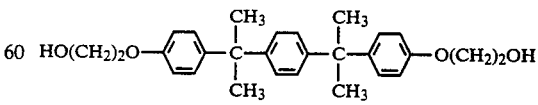
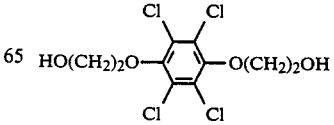

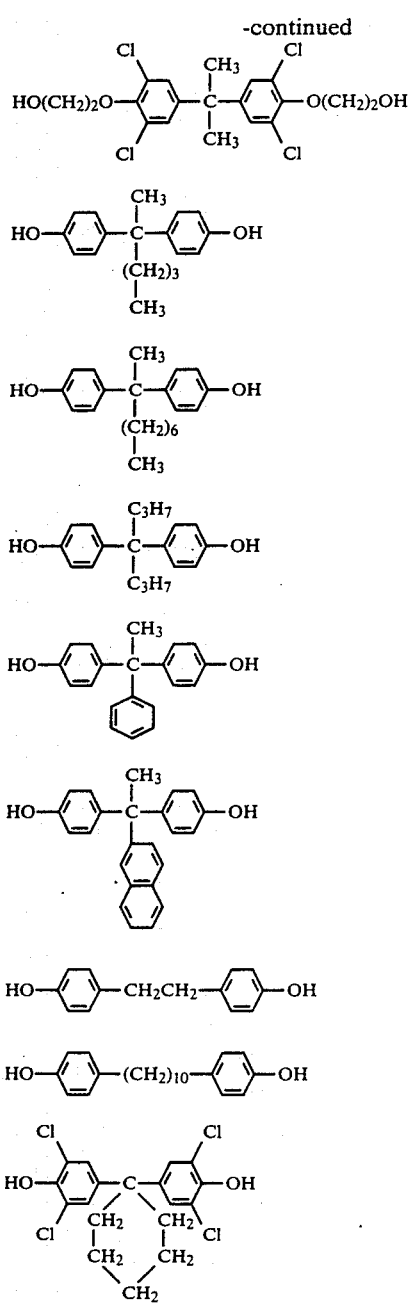

The polymer according to the present invention has a weight average molecular weight of from 5,000 to 500,000.

The polymer according to the present invention can be prepared by any known polymerization method such as emulsion polymerization, solution polymerization, block polymerazation and radiation polymerization.

The optical resin composition according to the present invention may contain an ultra-violet absorbing agent for the purpose of advancing durability against exposure of light. Usable ultra-violet absorbing agents are those which can efficaciously absorb ultra-violet radiation and should not harm the inherent characteristics of the resin, and preferably those which should not reduce the transmittance of the visible light. The usable ultra-violet absorbing agents include phenyl o-hydroxysalicylate type compounds, o-hydroxybenzophenone type compounds, 2-(o-hydroxyphenyl)bnezotriazole type compounds and cyano acrylate type compounds.

The optical element according to the present invention may be prepared by molding the optical resin composition by way of any molding method which comprise completely or halfway melting the resin and molding the thus melted resin, such as an injection molding in the first place, a compression molding and blended methods of the injection molding and the compression molding such as called Rolinx method and micromolding method. The optical element according to the present invention may effectively applicable to the molding methods such as injection molding in which the molding products have relatively high values of the birefringence. The optical resin composition may effectively applicable, in the second place next to the injection molding, to the Rolinx method or mocromolding method, and, in the third place to the compression molding.

Since the resin compositions having high fluidity are worse in heat resistivity, such resin compositions if employed may contain a little amount of a monomer having cross linking ability for the purpose of improving the heat resistivity of the molding product. The resin composition including cross linking monomer may be molded while remaining high fluidity and may be subjected to cross-linking hardening after molded by irradiating gamma ray, an electron beam, X-rays, an ultra-violet radiation or the like.

Heat stability of the molding product is, in some cases, effected by the humidification of the molding product. The molding product, therefore, may be coated at its surfaces in order to prevent the humidification and consequently to advancing the dimention stability of the molding product. Usable methods of surface resin coating of the molding product are, for example, a method comprising applying a monomer or prepolymer of the resin to the surface of the molding product and polymerization hardening the monomer or prepolymer by way of thermal polymerazation, radiation-induced polymerization, electron polymerization or the like, a method comprising spraying polymer solution, and plasma polymerization. Usable resin for the surface coating are, by way of example, polymers containing one or more monomer components selected from fluoroalkylene compounds such as tetrafluoroethylene, organosilane compounds such as tetramethylsilane, orthosilicate compounds such as tetraethyl orthosilicate, fluoroalkyl methacrylate compounds such as pentafluoroethyl methacrylate, conjugated nitrile compounds such as acrylonitrile, and styrene compounds such as styrene and chlorostyrene.

The polymer according to the present invention may effectively applicable to the molding of the optical element which has lower double refraction than the known polycarbonate type resins. The melt flow rate of the polymer according to the present invention is preferably more than or equal to 10 g/10 min., more preferably 20 g/10 min. as measured based on ISO R-1133 Standard under the conditions of 230° C. and 5 kgf.

The optical element which is prepared by molding the optical resin composition according to the present invention, is the element which has its function appearing while the light transmits through or reflect from it. The optical element according to the present invention may be exemplified by lenses used for still-camera, video camera, telescope, spectacles, contact lenses, a collector for solar lights or the like, prisms such as pentaprism, mirrors such as concave spherical mirror, polygon morror and the like, optical fibers, light-conductive elements used in light waveguide and discs such as audio disc, video disc and the like.

The present invention is more specifically described by the following Examples which should not limit the scope of the present invention.

EXAMPLE 1

Into the reaction vessel equipped with a condenser, a gas inlet, a thermometer and stirrer, was put the following resin composition and introduced thereinto 50 parts by weight of phosgene.

(resin composition)
tetrachlorobisphenol A: 100 parts by weight
sodium hydroxide: 60 parts by weight
water: 1000 parts by weight
dichloromethane: 1000 parts by weight After the introduction of phosgene, 2 parts by weight of 5% aqueous solution of triethylamine was added to the reaction mixture. Thereafter the mixture was continuously stirred and subsequently the organic layer was separated therefrom. The thus separated organic layer was condensed to its amount of about 1000 ml and added to 4000 parts by weight of methanol which is stirred to obtain a precipitate of a polymer.

After being dried and molded to have a pellet-like shape, the polymer was subjected to the measurement of the melt flow rate based on ISO R-1133 Standard under the conditions of 230° C. and 5 kgf. As a result of the measurement, the polymer appeared to have the melt flow rate of 9.2 g/10 min. In the mean time, the pellet of the polymer was subjected to the injection molding at the resin temperature of 260° C. to give a plastic lens which has a thickness of 3 mm in the central portion thereof and which has a phase delay of 180 degree and a refractive index of 1.61.

In the same manner, the commercially available polycarbonate resin which has low viscosity was subjected to the injection molding to give lens having a phase delay of 420 degrees.

EXAMPLE 2

The polymer was obtained in the same manner as in Example 1, by using the following resin composition and introducing thereto 50 parts by weight of phosgene.

(resin composition)
Bisphenol A: 100 parts by weight
pottasium hydroxide: 80 parts by weight
water: 1000 parts by weight
dichloromethane: 1500 parts by weight
sodium borohydride: 2 parts by weight The thus obtained polymer resin was subjected to the injection molding at the resin temperature of 260° C. to give the molding product which has a phase delay of 150 degrees and which has the melt flow rate of 12.2 g/min. as measured basedn on ISO R-1133 Standard under the conditions of 230° C. and 5 kgf.

What is claimed is:

1. An optical element including an optical resin composition consisting essentially of a polycarbonate, said optical resin composition having a melt flow rate of at least 5.0 grams/10 minutes as measured based on International Standards Organization Reference 1133 Standard at 230° C. and 5 kg, said optical resin composition having a glass transition point of at least 100° C., said polycarbonate having a major repeating unit represented by Formula I or II,

  I

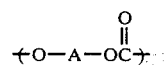  II wherein $Ar_1$ and $Ar_2$ are each a cycloalkylene, R is selected from alkylene, cycloalkylene, $-O-$, $-O-Ar_3-O-$, $-S-$, $-SO-$, $-SO_2-$, $-SO_2-Ar_3-SO_2-$, $-R_1-Ar_4-R_1-$, $-O-R_1-O-$,

$-CONH-R_1-NHCO-$, or $-Ar_5-R_1-$; $Ar_3$ and $Ar_4$ are individually phenylene or bisphenylene; $R_1$ is an alkylene; $R_2$ is an alkyl, $Ar_5$ is a cycloalkylene; and A is selected from an alkylene, a cycloalkylene, $-R_1-Ar_4-R_1-$, $-R_1-Ar_5-R_1-$, $-R_1-O-Ar_4-O-R_1-$, or $-R_1-O-Ar_4-X-Ar_4-O-R_1-$; and X represents $-SO_2-$, $-CO-$, an alkylene group, or $-R_1-Ar_4-R_1-$.

2. An optical resin composition consisting essentially of a polycarbonate, said optical resin composition having a melt flow rate of at least 5.0 grams/10 minutes as measured based on International Standards Organization Reference 1133 Standard at 230° C. and 5 kg, said optical resin composition having a glass transition point of at least 100° C., said polycarbonate having a major repeating unit represented by Formula I or II,

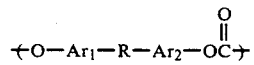  I

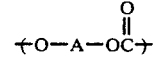  II wherein $Ar_1$ and $Ar_2$ are each a cycloalkylene, R is selected from alkylene, cycloalkylene, $-O-$, $-O-Ar_3-O-$, $-S-$, $-SO-$, $-SO_2-$, $-SO_2-Ar_3-SO_2-$, $-R_1-Ar_4-R_1-$, $-O-R_1-O-$,

$-CONH-R_1-NHCO-$, or $-Ar_5-R_1-$; $Ar_3$ and $Ar_4$ are individually phenylene or bisphenylene; $R_1$ is an alkylene; $R_2$ is an alkyl, $Ar_5$ is a cycloalkylene; and A is selected from an alkylene, a cycloalkylene group, $-R_1-Ar_4-R_1-$, $-R_1-Ar_5-R_1-$, $-R_1-O-Ar_4-O-R_1-$, or $-R_1-O-Ar_4-X-Ar_4-O-R_1-$; and X represents $-SO_2-$, $-CO-$, an alkylene group, or $-R_1-Ar_4-R_1-$.

3. The optical element of claim 1, wherein said arylene is a phenylene or naphthylene, said cycloalkylene has 4 to 7 ring members, said alkylene is a straight or branched group having 1 to 18 carbon atoms; and said alkyl is a group having 1 to 6 carbon atoms.

4. The optical resin composition of claim 2, wherein said arylene is a phenylene or naphthylene, said cycloalkylene has 4 to 7 ring members, said alkylene is a straight or branched group having 1 to 18 carbon atoms;

and said alkyl is a group having 1 to 6 carbon atoms.

5. The optical element of claim 1, wherein at least 50% by weight of said polycarbonate is represented by Formula I or II.

6. The optical resin composition of claim 2, wherein at least 50% by weight of said polycarbonate is represented by Formula I or II.

* * * * *